US012088240B1

(12) United States Patent
Wang et al.

(10) Patent No.: US 12,088,240 B1
(45) Date of Patent: Sep. 10, 2024

(54) UNIVERSAL SUN-TRACKING ADJUSTMENT DEVICE, METHOD AND SYSTEM

(71) Applicant: FULIJIATE NANTONG NEW ENERGY TECHNOLOGY CO., LTD., Nantong (CN)

(72) Inventors: Qingquan Wang, Nantong (CN); Zengming Ning, Nantong (CN)

(73) Assignee: FULIJIATE NANTONG NEW ENERGY TECHNOLOGY CO., LTD., Nantong (CN)

( * ) Notice: Subject to any disclaimer, the term of this patent is extended or adjusted under 35 U.S.C. 154(b) by 0 days.

(21) Appl. No.: 18/340,903

(22) Filed: Jun. 26, 2023

(51) Int. Cl.
| | |
|---|---|
| H02S 20/32 | (2014.01) |
| F21S 9/03 | (2006.01) |
| F21V 19/00 | (2006.01) |
| F21V 23/00 | (2015.01) |
| F21Y 115/10 | (2016.01) |
| G01S 13/02 | (2006.01) |
| H02S 30/10 | (2014.01) |

(52) U.S. Cl.
CPC ............... *H02S 20/32* (2014.12); *F21S 9/032* (2013.01); *F21S 9/037* (2013.01); *F21V 19/0015* (2013.01); *F21V 23/004* (2013.01); *G01S 13/02* (2013.01); *H02S 30/10* (2014.12); *F21Y 2115/10* (2016.08); *G01S 2013/0236* (2013.01)

(58) Field of Classification Search
CPC . F21S 9/032; F21S 9/035; F21S 9/037; H02S 20/32; H02S 30/10; F21V 19/0015; F21V 23/004
See application file for complete search history.

(56) References Cited

U.S. PATENT DOCUMENTS

2011/0122606 A1* 5/2011 Ku ........................... H02S 20/30
136/246

* cited by examiner

Primary Examiner — Thanh Luu

(57) ABSTRACT

The invention discloses a universal sun-tracking adjustment device, method and system, which are applied to a solar lamp with a universal sun-tracking adjustment device. The solar lamp comprises a lamp body and a lamp holder. The universal sun-tracking adjustment device comprises a lamp body, a lamp holder and an adjusting device. Light intensity information can be acquired by photosensitive sensors on the lamp body and be transmitted to a main control circuit board, and the main control circuit board can control the adjusting device to change the angle of a solar photovoltaic panel on the lamp body with the change of the position of the sun, such that the charging efficiency of the solar photovoltaic panel is improved.

8 Claims, 8 Drawing Sheets

US 12,088,240 B1

UNIVERSAL SUN-TRACKING ADJUSTMENT DEVICE, METHOD AND SYSTEM

BACKGROUND OF THE INVENTION

1. Technical Field

The invention relates to the technical field of lamps, in particular to a universal sun-tracking adjustment device, method and system.

2. Description of Related Art

With the progress of technology, environmental problems are becoming increasingly severe. At present, energy-saving and environmentally-friendly solar lamps are used as outdoor lighting devices in most occasions, and the solar lamps can directly receive solar energy and convert the solar energy into electric energy, which is then stored for lighting, thus being convenient to use and capable of saving energy.

The angle of the photovoltaic panel of existing solar lamps is fixed, while the irradiation trajectory of the sun is dynamic, so the charging time and efficiency of the photovoltaic panel are compromised to some extent.

Thus, it is necessary to design a universal sun-tracking adjustment device, method and system to solve these problems.

BRIEF SUMMARY OF THE INVENTION

In view of the defects in the prior art, the technical issue to be settled by the invention is to provide a universal sun-tracking adjustment device, method and system, which can follow the irradiation trajectory of the sun and automatically adjust a solar photovoltaic panel to allow it to accurately face the sun to be charged.

To fulfill the above objective, the invention provides the following technical solution:

A universal sun-tracking adjustment device comprises a lamp body, a lamp holder and an actuating device;

The lamp body comprises an LED lamp unit, a solar photovoltaic panel and photosensitive sensors, the solar photovoltaic panel and the photosensitive sensors are fixedly mounted on a surface of the lamp body and are located on a same side of the lamp body, and the LED lamp unit is fixedly mounted on a side, away from the solar photovoltaic panel, of the lamp body;

The lamp holder comprises a main control circuit board and a battery, the main control circuit board and the battery are fixedly mounted in the lamp holder, and the solar photovoltaic panel, the photosensitive sensors and the main control circuit board are all electrically connected to the battery;

The actuating device comprises a stepping motor, a first rotating member and a second rotating member, the first rotating member is fixedly connected to an output end of the stepping motor, the second rotating member is fixedly connected to the lamp body, the first rotating member and the second rotating member are engaged for transmission, the stepping motor and the second rotating member are fixedly connected to the lamp body and the lamp holder respectively, and the stepping motor is electrically connected to the battery;

The lamp body is rotatably connected to the lamp holder through the actuating device.

Preferably, a microwave radar detection module, a remote control module, a memory module and a warning light are disposed on the main control circuit board; when the photosensitive sensors are covered by foreign matter and are unable to acquire light intensity information normally, the warning light will be turned on to remind users that the sensors are abnormal.

Preferably, in a first embodiment, the lamp body comprises two photosensitive sensors, an angle between the two photosensitive sensors is 120°, and a normal of the angle between the two photosensitive sensors is perpendicular to the solar photovoltaic panel.

Preferably, the actuating device comprises a first bearing, the first rotating member in the actuating device is a worm, the second rotating member is a worm gear, a hub on a side of the worm gear is higher than a tooth surface, a first mounting hole to be fixedly connected to the lamp body is formed in an inner ring of the worm gear, a first wire hole allowing a wire to penetrate through is formed in the inner ring of the worm gear, an outer ring of the hub on the side, higher than the tooth surface, of the worm gear is in interference fit with an inner ring of the first gear, and an outer ring of the first bearing is in interference fit with the lamp holder.

Preferably, in a second embodiment, the lamp body comprises four photosensitive sensors regularly mounted on a periphery of the solar photovoltaic panel.

Preferably, a support rod assembly is disposed between the lamp body and the lamp holder, the first rotating member in the actuating device is a driving gear, the second rotating member is a driven gear, two actuating devices are arranged, the lamp body is rotatably connected to the support rod assembly through one actuating device, the lamp holder is rotatably connected to the support rod assembly through the other actuating device, and the two actuating devices are mounted perpendicular to each other.

Preferably, the actuating device comprises a second bearing, a hub on a side of the driven gear is higher than a tooth surface, a second mounting hole fixedly connected to the lamp body or the support rod assembly is formed in an inner ring of the driven gear, a second wire hole allowing a wire to penetrate through is formed in the inner ring of the driven gear, an outer ring of the hub on the side, higher than the tooth surface, of the driven gear is in interference fit with an inner ring of the second bearing, and an outer ring of the second bearing is in interference fit with the support rod assembly and/or the lamp holder.

A universal sun-tracking adjustment method comprises:

Acquiring, by multiple photosensitive sensors, ambient light intensities at a current angle;

Receiving, by a main control circuit board, the current ambient light intensities sent from the photosensitive sensors; and Comparing, by the main control circuit board, the received ambient light intensities, and determining whether there is a difference between the ambient light intensities; if so, driving an actuating device to control the angle of a solar photovoltaic panel; otherwise, keeping the angle of the solar photovoltaic panel unchanged.

Preferably, the actuating device comprises a stepping motor and a driving mechanism; and when determining that there is a difference between the multiple light intensities, the main control circuit board turns on a power source of the stepping motor, and rotary power of the stepping motor is transmitted to a lamp body through the driving mechanism, such that the solar photovoltaic panel rotates with the lamp body to change the angle with respect to the sun.

Preferably, a voltage change threshold is set for the photosensitive sensors; and if a voltage of the photosensitive sensors is less than the voltage change threshold, the main control circuit board drives a power supply of the LED lamp unit and synchronously drives the actuating device to rotate the lamp body to a lighting position recorded in a memory module; otherwise, the main control circuit turns off the power supply of the LED lamp unit.

Preferably, when the photosensitive sensors are covered by foreign matter, the main control circuit enters a memory working mode according to a recent working state of a device and turns on a warning light to remind users that the sensors are abnormal;

Preferably, the main control circuit is able to manage and monitor the state of charge of a battery to realize linear adjustment of brightness, such that an optimal lighting time is obtained.

The invention has the following beneficial effects:
1. In the invention, the operation of the motor can be automatically controlled according to information acquired by the photosensitive sensors to enable the solar photovoltaic panel on the lamp body to rotate to follow the sun, such that the charging efficiency is improved.
2. In the invention, the actuating device adopts a worm-gear mechanism with a self-locking function as a driving mechanism, such that position deviations of the lamp body caused by external factors can be avoided.
3. In the invention, the angle can be adjusted through wireless remote control by means of a software program, infrared rays, Bluetooth, wifi, or the like.
4. In the invention, the microwave radar detection module is arranged to monitor passengers passing-by in real time and can automatically enable the lighting function when necessary, and the microwave radar avoids the reduction of sensitivity and other interference factors caused by changes of the air temperature, such that the accuracy and reliability are improved.

Figure 1:
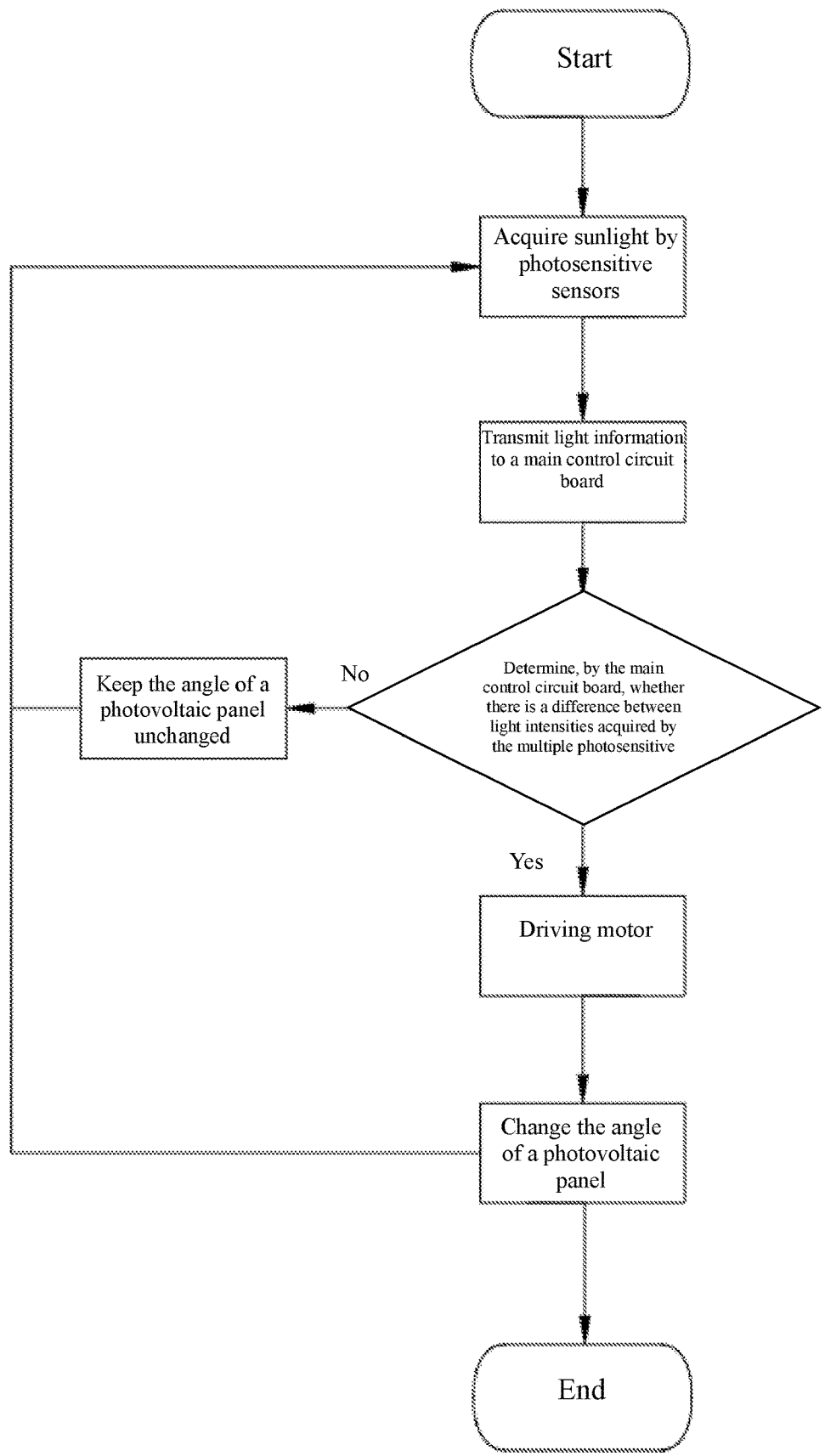
FIG. 1 is a flow diagram of the invention.

Reference signs of main components; 1, lamp body; 11, solar photovoltaic panel; 12, photosensitive sensor; 13, LED lamp unit; 14, lamp body shell; 15, lamp stand; 16, reflector; 17, lampshade; 18, front lamp body cover; 19, rear lamp body cover; 110, waterproof rubber ring; 111, first connecting shell; 112, second connecting shell; 2, lamp holder; 21, main control circuit board; 22, battery; 23, mounting plate; 24, base plate; 25, lamp holder hood; 27, mounting frame; 28, sealing ring; 29, rear lamp holder cover; 210, lamp holder stand; 3, actuating device; 31, stepping motor; 321, worm; 331, worm gear; 322, driving gear; 332, driven gear; 34, bearing; 4, support rod assembly; 41, support rod; 42, bearing pedestal; 43, bearing cap; 44, end cover; 45, support rod seat.

DETAILED DESCRIPTION OF THE INVENTION

To more clearly explain the invention, the invention will be further described below in conjunction with the accompanying drawings.

In the following description, details of common embodiments are provided to gain a better understanding of the invention. Obviously, the embodiments in the description are merely illustrative ones, and are not all possible ones of the invention. It should be understood that these specific embodiments are merely used to explain the invention, and are not used to limit the invention.

It should be understood that the term "include" and/or "comprise" used in the specification indicates the existence of a feature, an entity, a step, an operation, an element or an assembly referred to, without excluding the existence or addition of one or more other features, entities, steps, operations, elements, assemblies, or combinations thereof.

A universal sun-tracking adjustment device comprises: a lamp body 1, a lamp holder 2 and an actuating device 3; the lamp body 1 comprises an LED lamp unit 13, a solar photovoltaic panel 11 and photosensitive sensors 12, the solar photovoltaic panel 11 and the photosensitive sensors 12 are fixedly mounted on the surface of the lamp body 1 and are located on a same side of the lamp body 1, and the LED lamp unit 13 is fixedly mounted on a side, away from the photovoltaic panel 11, of the lamp body 1; the lamp holder 2 comprises a main control circuit board 21 and a battery 22, the main control circuit board 21 and the battery 22 are fixedly mounted in the lamp holder 2, and the solar photovoltaic panel 11, the photosensitive sensors 12 and the main control circuit board 21 are all electrically connected to the battery 22; the actuating device 3 comprises a stepping motor 31, a first rotating member 32 and a second rotating member 33, the first rotating member is fixedly connected to an output end of the stepping motor 31, the second rotating member is fixedly connected to the lamp body 1, the first rotating member and the second rotating member are engaged for transmission, the stepping motor 31 and the second rotating member are fixedly connected to the lamp body 1 and the lamp holder 2 respectively, and the stepping motor 31 is electrically connected to the battery 22; and the lamp body 1 is rotatably connected to the lamp holder 2 through the actuating device 3. When detecting that there is a difference between ambient light intensities acquired by multiple photosensitive sensors 12 at a current angle, the main control circuit board 21 turns on a power supply of the stepping motor 31, then the stepping motor 31 operates, and rotating power is transmitted to the lamp body 1 through the first rotating member and the second rotating member, such that the solar photovoltaic panel 11 on the lamp body 1 can rotate with the lamp body 1 to change the angle with respect to the sun, and thus, the charging efficiency of the solar photovoltaic panel 11 is improved.

Specifically, a microwave radar detection module is disposed on the main control circuit board 21, and the microwave radar detection module can monitor passengers passing-by in real time and automatically enable the lighting function when necessary; the microwave radar avoids the reduction of sensitivity and other interference factors caused by changes of the air temperature, such that the accuracy and reliability are improved.

Specifically, a remote control module is disposed on the main control circuit board 21, the angle can be adjusted through wireless remote control, and a remote control unit matched with the adjustment device can provide a lighting mode, and can set and adjust the brightness and lighting position of the LED lamp unit 13; the remote control can also be realized through an APP, infrared rays, Bluetooth, wifi, or the like, which means that the lamp can be controlled not only through the remote control unit, but also can be controlled by means of an intelligent terminal based on the IoT technique.

Specifically, a memory module is disposed on the main control circuit board 21; in the daytime, the solar photovoltaic panel is charged at a maximum angle; at night, the device is used for lighting, and at this moment, the device should be adjusted to the optimal lighting position; the initial lighting position is a lighting position set by means of the remote control unit or a default lighting position of the system when the device is used by users for the first time, and can be controlled and adjusted through the remote control unit according to temporary lighting requirements of users, the lighting position will be automatically stored by the memory module after being adjusted, and when night comes, the main control circuit board 21 will automatically drive the actuating device 3 to adjust the lamp body to the lighting position stored in the memory module.

Figure 2:
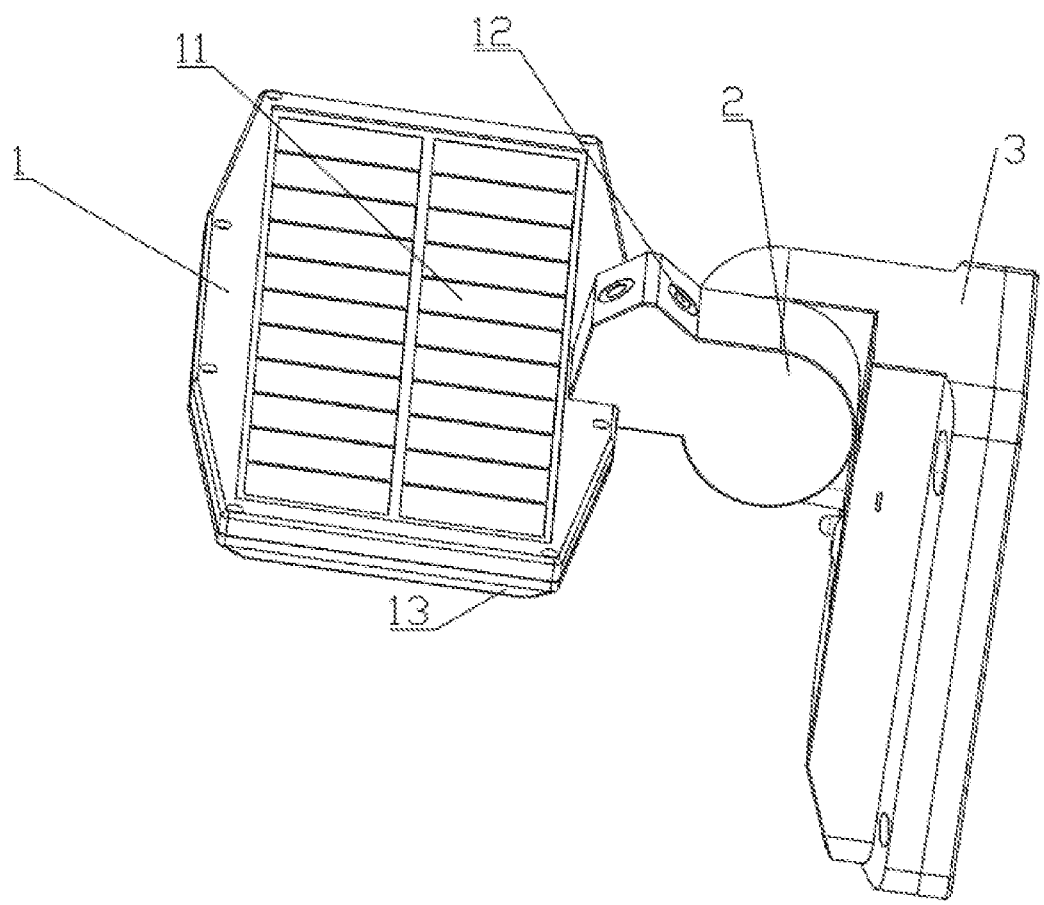
FIG. 2 is an overall view of Embodiment 1 of the invention.
Figure 3:
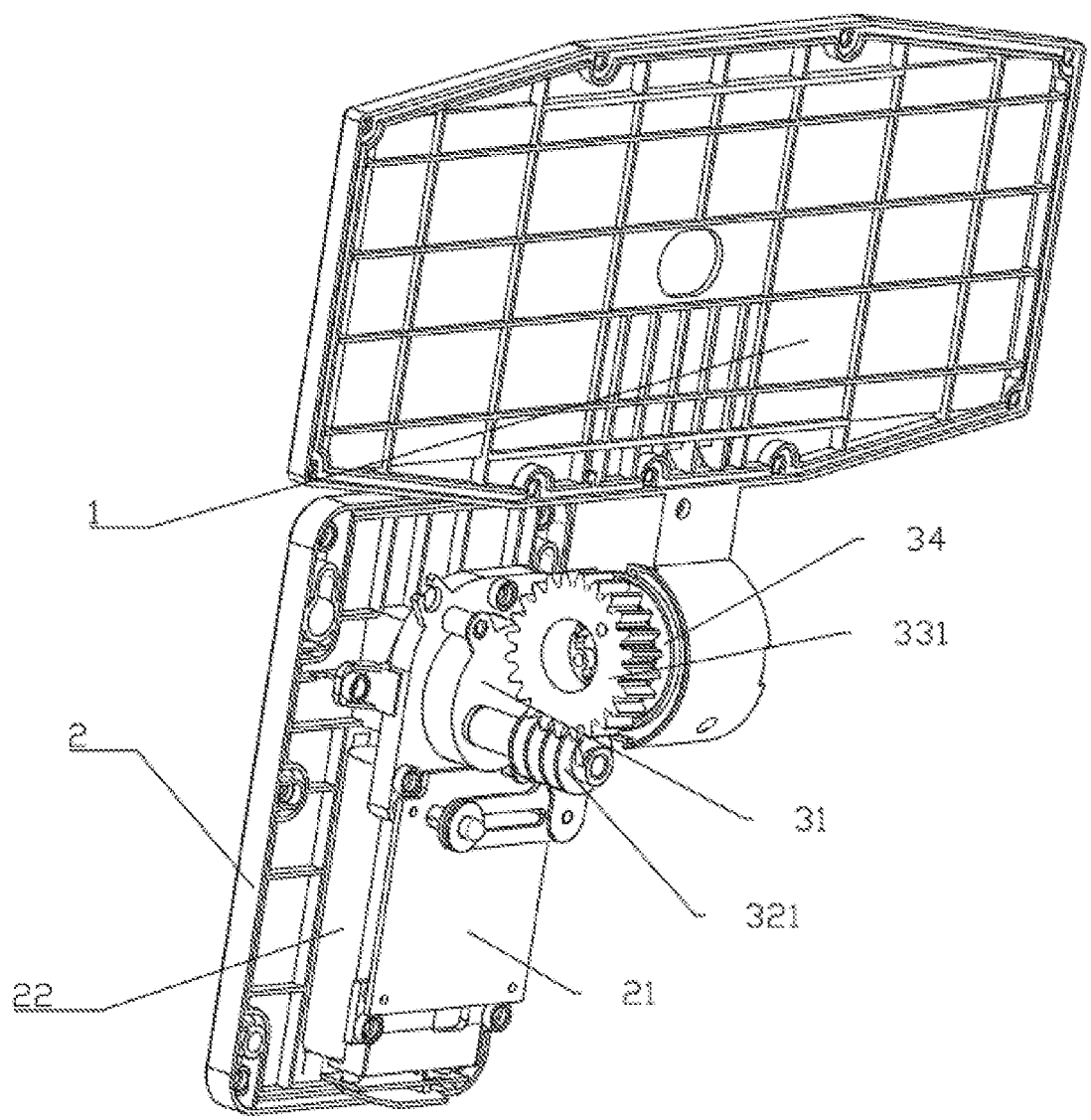
FIG. 3 is a structural view of Embodiment 1 of the invention.
Figure 4:
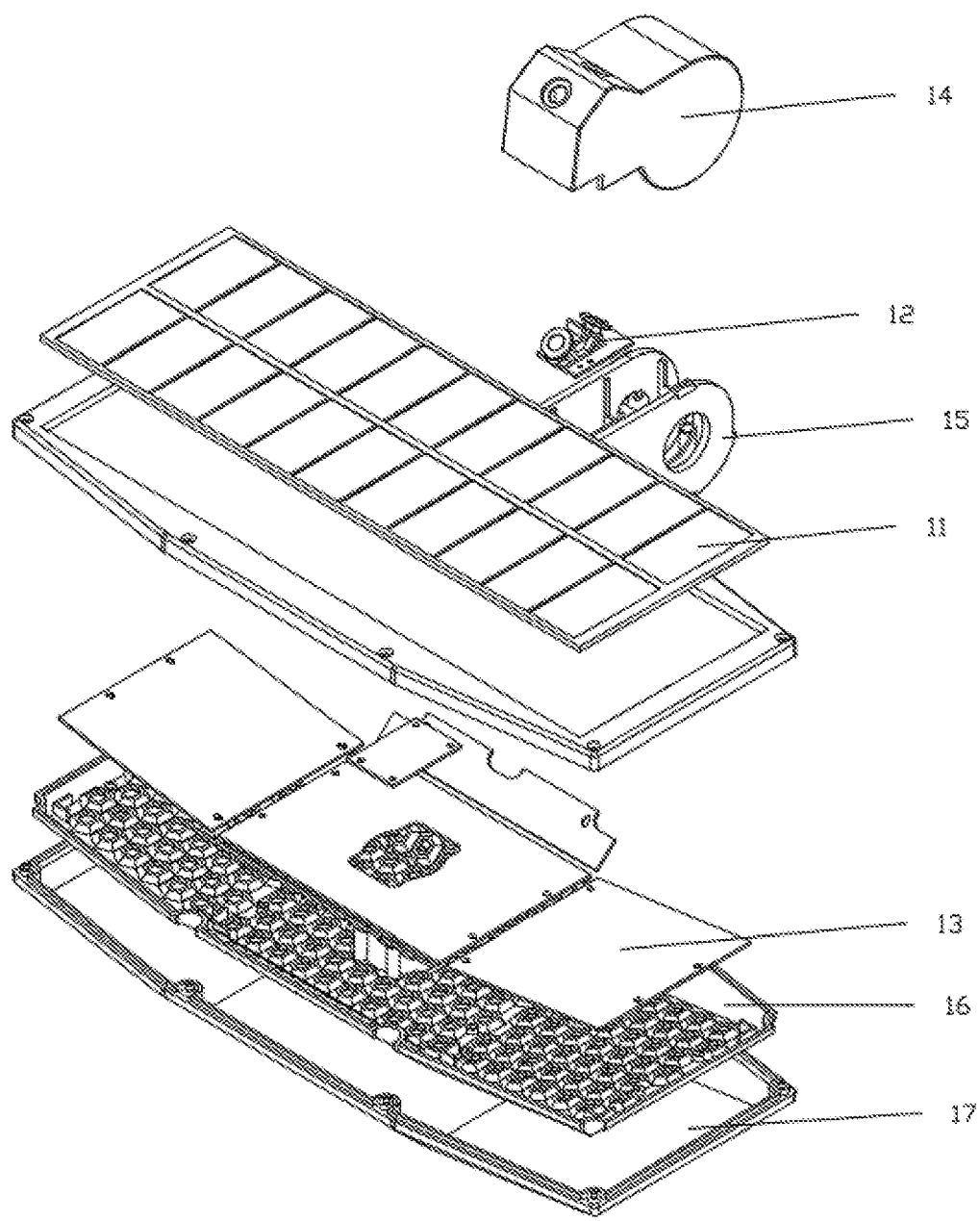
FIG. 4 is an exploded view of a lamp body in Embodiment 1 of the invention.

Specifically, as shown in FIG. 2 and FIG. 4 which illustrates a first embodiment of the invention, the lamp body comprises two photosensitive sensors 12, an angle between the two photosensitive sensors 12 is 120°, and a normal of the angle between the two photosensitive sensors 12 is perpendicular to the solar photovoltaic panel 11; when the position of the sun changes, light intensities received by the two photosensitive sensors 12 will be different, and the ambient light intensities acquired by the two photosensitive sensors 12 are compared through a chip algorithm in the main control circuit board 21 to determine whether there is a difference between the ambient light intensities acquired by the two photosensitive sensors 12 to control the actuating device 3 to start or stop, so as to adjust the angle of the solar photovoltaic panel 11 with respect to the sun.

The first rotating member in the actuating device 3 is a worm 321, the second rotating member is a worm gear 331, a hub on one side of the worm gear 331 is higher than a tooth surface, a first mounting hole to be fixedly connected to the lamp body 1 is formed in an inner ring of the worm gear 331, a first wire hole allowing a wire to penetrate through is formed in the inner ring of the worm gear 331, an inner ring of the hub on the side, higher than the tooth surface, of the worm gear 331 is in interference fit with an inner ring of a bearing 34, and an outer ring of the bearing 34 is in interference fit with the lamp holder.

Figure 5:
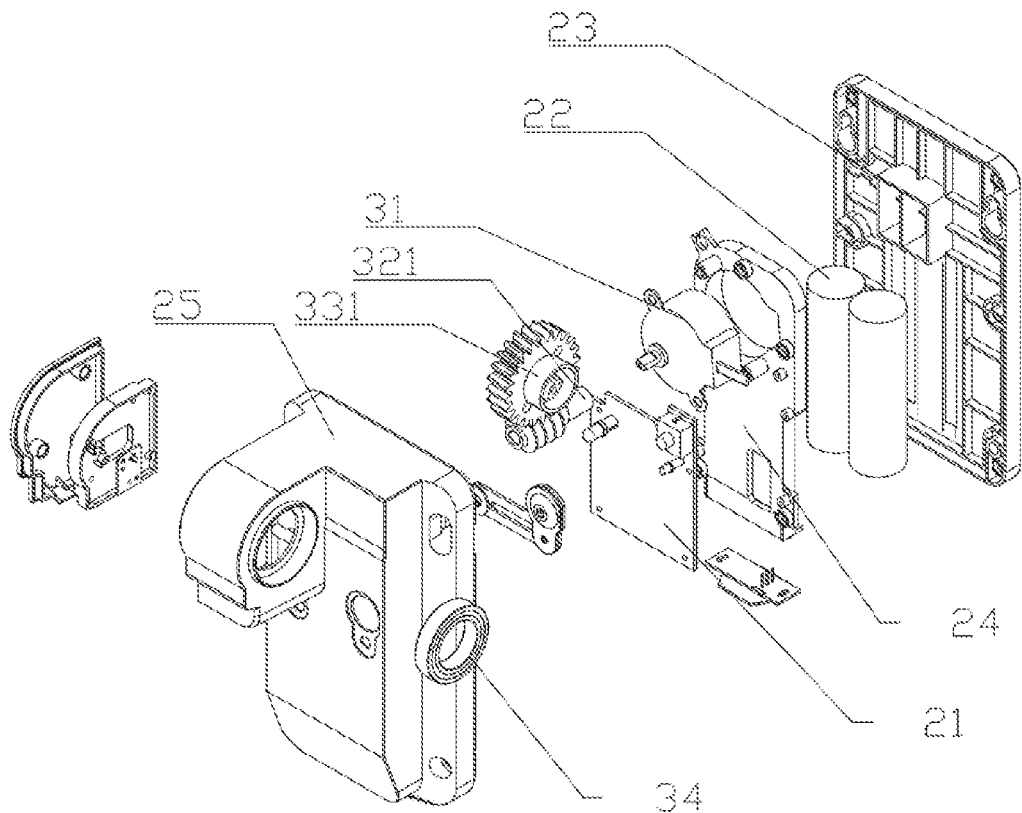
FIG. 5 is an exploded view of a lamp holder in Embodiment 1 of the invention.
Figure 6:
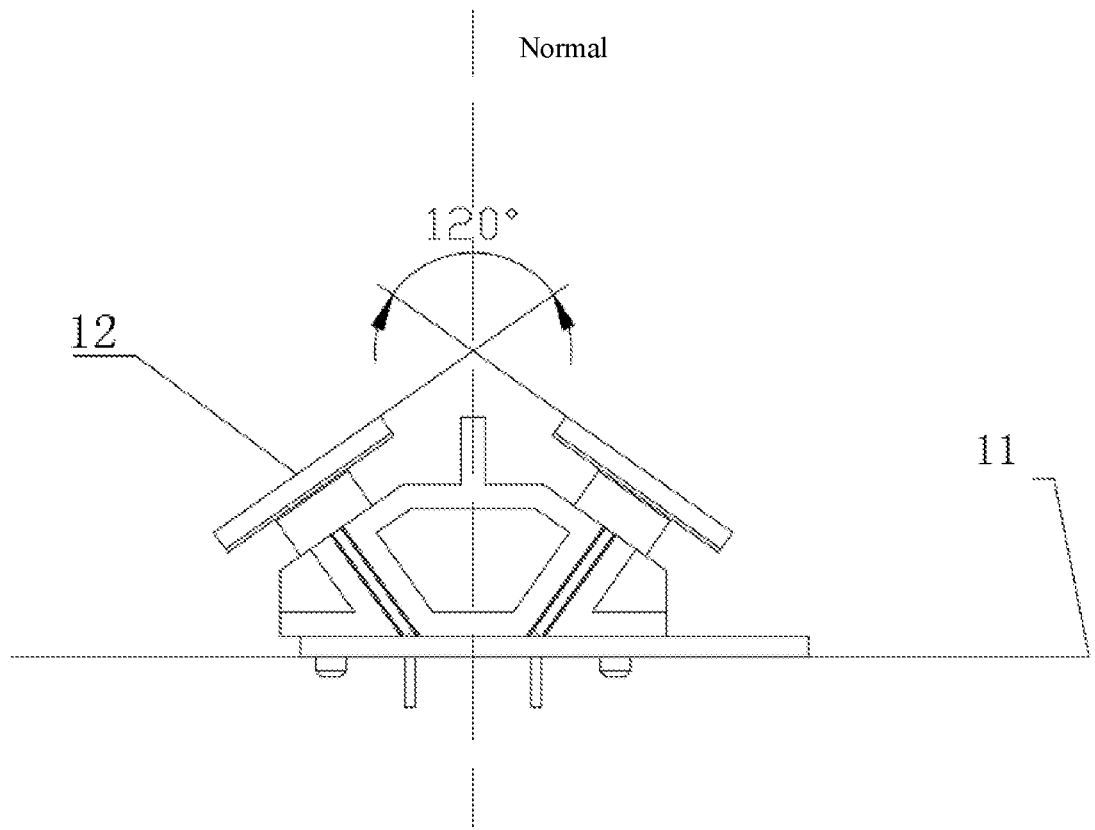
FIG. 6 is a schematic diagram of the installation positions of photosensitive sensors in Embodiment 1 of the invention.
Figure 7:
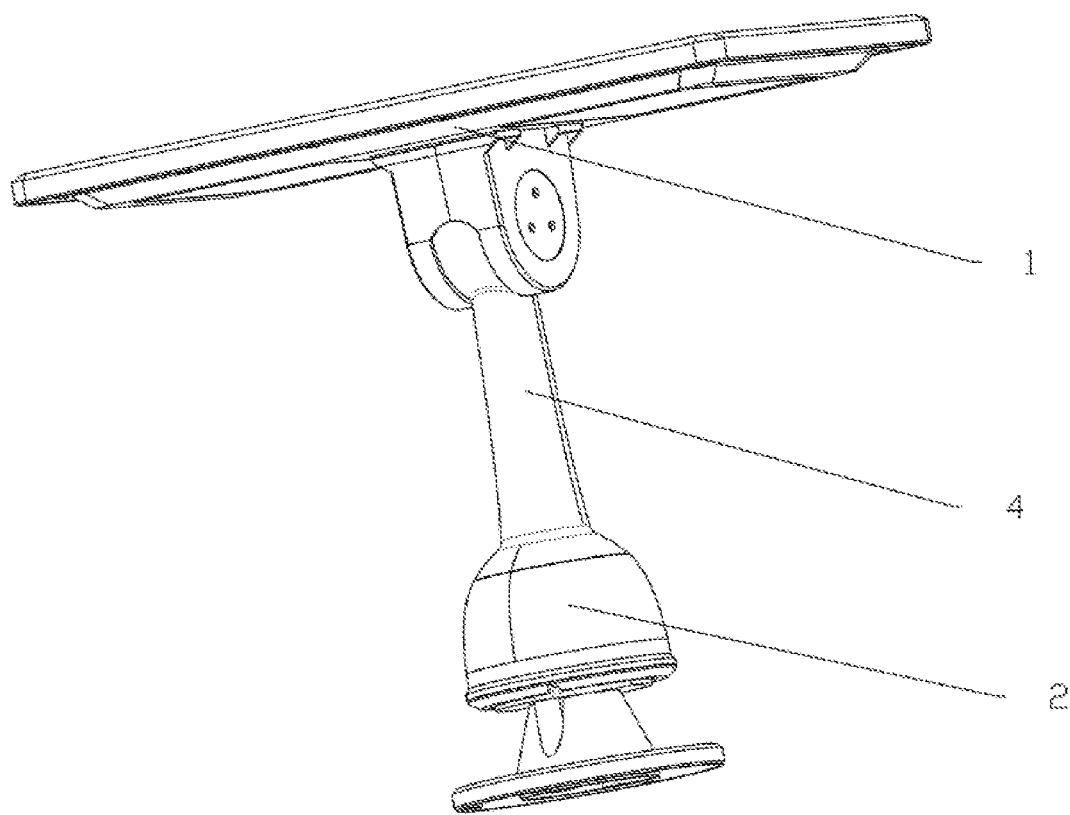
FIG. 7 is an overall view of Embodiment 2 of the invention.
Figure 8:
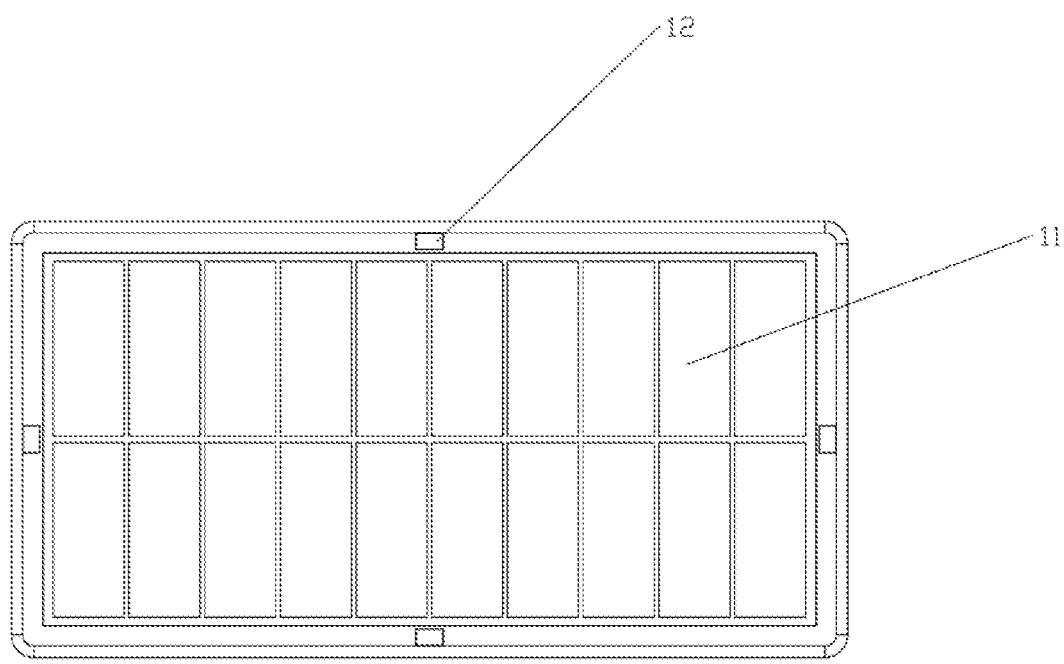
FIG. 8 is a top view of Embodiment 2 of the invention.
Figure 9:
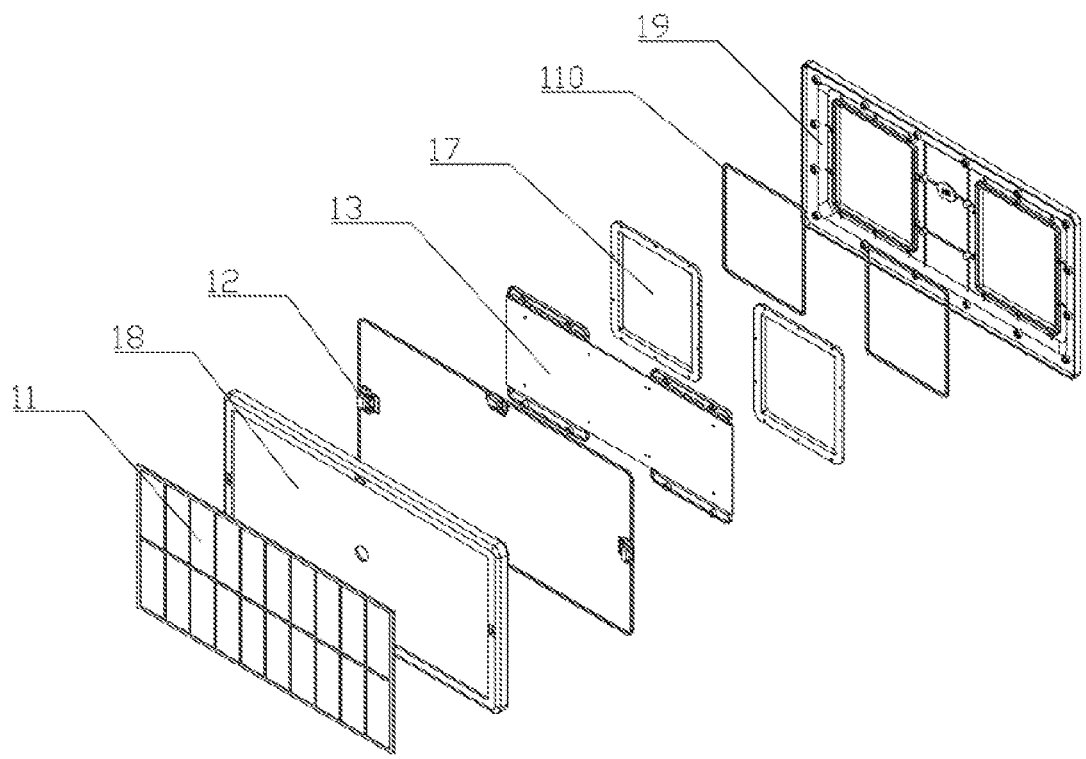
FIG. 9 is an exploded view of a lamp body in Embodiment 2 of the invention.

Specifically, as shown in FIG. 5-FIG. 7 which illustrate a second embodiment of the invention, the lamp body comprises four photosensitive sensors 12, which are regularly distributed on the same side of the solar photovoltaic panel 11; when the position of the sun changes, the light intensities received by the four photosensitive sensors 12 will be different; a difference between the light intensities acquired by the four photosensitive sensors 12 is determined through a chip algorithm in the main control circuit board 21, and when the difference between the light intensities acquired by the four photosensitive sensors 12 is zero, the solar photovoltaic panel exactly faces the sun.

Specifically, a solar lamp comprises a support rod assembly 4, the first rotating member in the actuating device 3 is a driving gear 322, the second rotating member is a driven gear 332, two actuating devices 3 are arranged, the lamp body 1 is rotatably connected to the support rod assembly 4 through one actuating device, the lamp holder 2 is rotatably connected to the support rod assembly 4 through the other actuating device 3, and the two actuating devices 3 are mounted perpendicular to each other. Through the rotation of the two actuating devices in two directions, the solar photovoltaic panel can rotate with the lamp body within 360° in space, and can rotate more flexibly, and the sunlight always coincides with the normal of the solar photovoltaic panel 11, such that the charging efficiency of the solar photovoltaic panel is further improved.

Specifically, a hub on one side of the driven gear 332 is higher than a tooth surface, a second mounting hole to be fixedly connected to the lamp body 1 or the support rod assembly 4 is formed in an inner ring of the driven gear 332, a second wire hole allowing a wire to penetrate through is formed in the inner ring of the driven gear 332, an outer ring of the hub on the side, higher than the tooth surface, of the driven gear 332 is in interference fit with an inner ring of a bearing 34, and an outer ring of the bearing 34 is in interference fit with the support rod assembly or/and the lamp holder.

Specifically, as shown in FIG. 1, the invention discloses a universal sun-tracking adjustment method, comprising:

Acquiring, by multiple photosensitive sensors 12, ambient light intensities at a current angle;

Receiving, by a main control circuit board 21, the current ambient light intensities sent from the photosensitive sensors 12; and Comparing, by the main control circuit board 21, the received light intensities, and determining whether there is a difference between the light intensities; if so, driving an actuating device 3 to control the angle of a solar photovoltaic panel 11; otherwise, keeping the angle of the solar photovoltaic panel 11 unchanged.

Specifically, the actuating device comprises a stepping motor 31 and a driving mechanism; when determining that there is a difference between the multiple light intensities, the main control circuit board 21 turns on a power supply of the stepping motor 31, and rotating power of the stepping motor 31 is transmitted by the driving mechanism to a lamp body 1, such that the solar photovoltaic panel 11 can rotate with the lamp body 1 to change the angle with respect to the sun.

Specifically, a voltage change threshold is set for the photosensitive sensors 12; and if the voltage of the photosensitive sensors 12 is less than the voltage change threshold, the main control circuit board 21 drives a power supply of an LED lamp unit 13; otherwise, the main control circuit 21 turns off the power supply of the LED lamp unit 13.

The invention provides a universal sun-tracking adjustment system, comprising a single-axis sun-tracking adjustment system and a double-axis sun-tracking adjustment system. First, referring to FIG. 1-FIG. 6 which illustrates the single-axis sun-tracking adjustment system of the invention, the single-axis sun-tracking adjustment system is composed of a single-axis sun-tracking device and a single-axis sun-tracking method, wherein the single-axis sun-tracking device comprises a lamp body 1 and a lamp holder 2, wherein a shell of the lamp holder 2 is formed by a lamp holder hood 25 and a mounting plate 23 which are buckled together, a battery 22, a main control circuit board 21 and a stepping motor 31 are disposed in the lamp holder 2, an output shaft of the stepping motor 31 is connected to a worm 321, a through hole is formed in a position, matched with the lamp body 1, of the lamp holder hood 25, a worm gear 331 is disposed in the lamp holder 2, the worm gear 331 is mounted in the through hole of the lamp holder cover 25 through a bearing 34, the lamp body 1 is fixedly connected to the worm gear 331 through the through hole, a solar photovoltaic panel 11 and photosensitive sensors 12 are disposed above the lamp body 1, an LED lamp unit 13 is disposed below the lamp body, the lamp body 1 further comprises a lamp body shell 14, a lamp stand 15, a reflector 16 and a lampshade 17, the number of the photosensitive sensors 12 is two, an angle between the two photosensitive sensors 12 is 120°, and a normal of the angle between the two photosensitive sensors 12 is perpendicular to the solar photovoltaic panel; when the position of the sun changes, light intensities received by the two photosensitive sensors 12 will be different, and a difference between the ambient light intensities acquired by the two photosensitive sensors 12 is determined through a chip algorithm in the main control circuit board 21 to control the operation of the stepping motor 31; the main control circuit board 21 and the stepping motor 31 are mounted on the mounting plate 23 through a base plate 24, the main control circuit board 21 is electrically connected to the battery 22, and the voltage of the battery 22 is monitored by a chip on the main control circuit board 21 in real time to dynamically match the operating current, such that the operating time is guaranteed; an arched protrusion is disposed above the lamp holder hood 25, a through hole is formed in a side face of the arched protrusion, the bearing 34 is mounted in the through hole, and the worm gear 331 is disposed on the arched protrusion, such that a sufficient movement space is provided for the worm gear 331; three identical through holes are formed in the worm gear 331, and the lamp stand 15 is fixed on the worm gear 331 through the three through holes, such that after the lamp stand 1 and the worm gear 331 are connected, wire holes allowing wires in the lamp body 1 to penetrate through are reserved in the worm gear 331, and the wires of parts in the lamp body 1 can be connected to the main control circuit board 21 through the wire holes, without disturbing normal rotation of the lamp body 1; a hub on one side of the worm gear 331 is higher than the tooth surface, and an outer ring of the hub of the worm gear 331 is in interference fit with an inner ring of the bearing 34, such that one shaft part is omitted, and the production cost is reduced; wherein, the stepping motor 31, the worm 321 and the worm gear 331 form an actuating device 3, and the lamp body 1 is rotatably connected to the lamp holder 2 through the actuating device 3.

The operating process of the single-axial sun-tracking system comprises:

Step 1: acquiring, by multiple photosensitive sensors 12, ambient light intensities at a current angle;

Step 2: receiving, by the main control circuit board 21, the current ambient light intensities sent from the photosensitive sensors 12; and Step 3: comparing, by the main control circuit board 21, the received ambient light intensities, and determining whether there is a difference between the ambient light intensities; if so, turning on, by the main control circuit board 21, a power supply of the stepping motor 31, and transmitting rotary power of the stepping motor 31 to the lamp body 1 through a driving mechanism to enable the solar photovoltaic 11 to rotate with the lamp body 1; otherwise, keeping the angle of the solar photovoltaic panel 11 unchanged;

A voltage change threshold is set for the photosensitive sensors 12; and if the voltage of the photosensitive sensors 12 is less than the voltage change threshold, the main control circuit board 21 drives a power supply of the LED lamp unit 13; otherwise, the main control circuit 21 turns off the power supply of the LED lamp unit 13.

Figure 10:
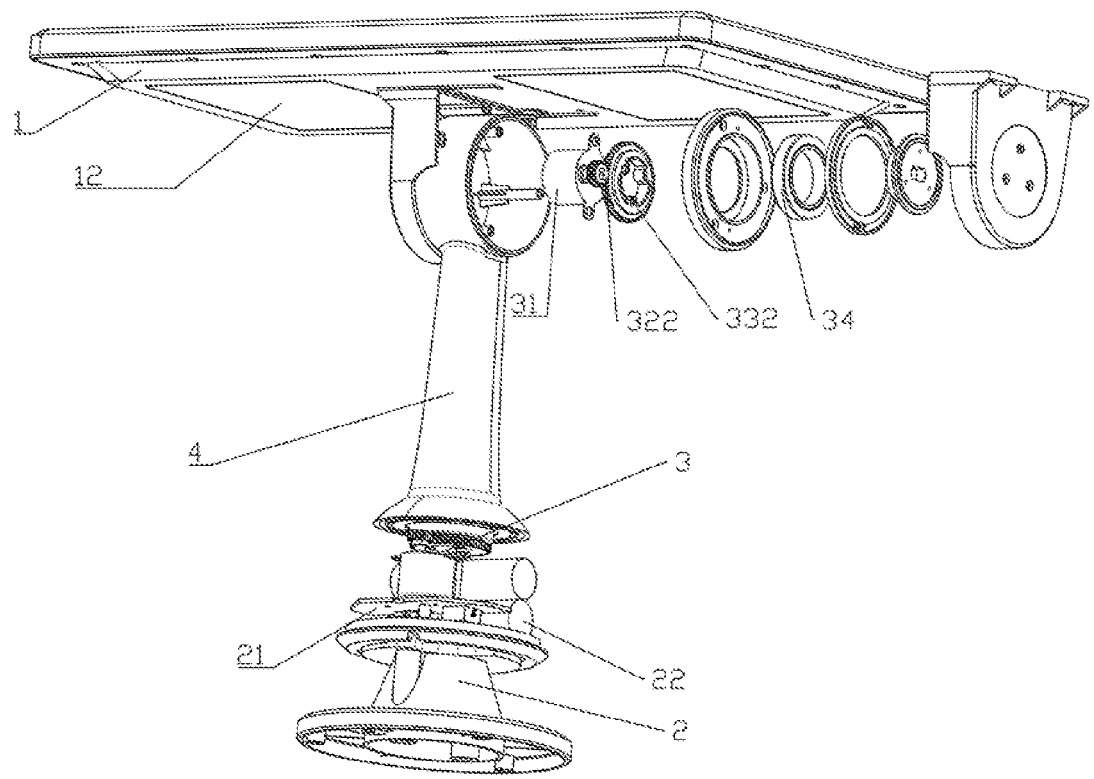
FIG. 10 is a structural view of an actuating device in Embodiment 2 of the invention.
Figure 11:
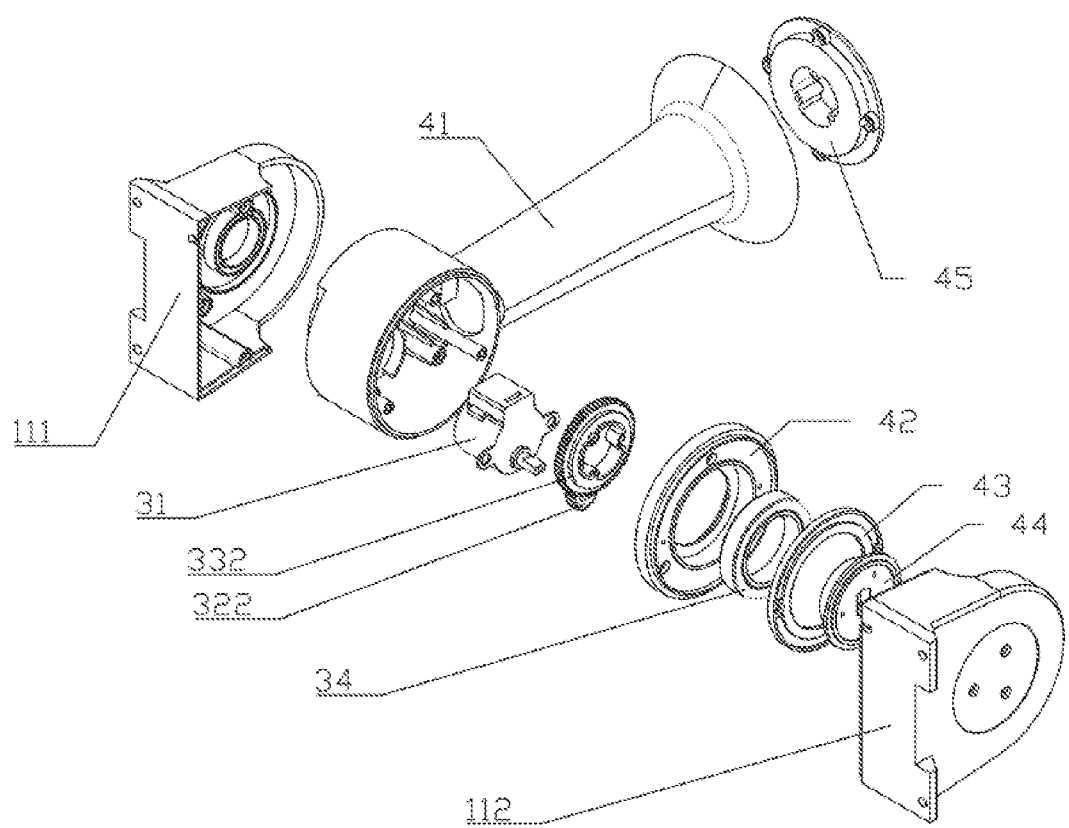
FIG. 11 is an exploded view of a support rod assembly in Embodiment 2 of the invention.
Figure 12:
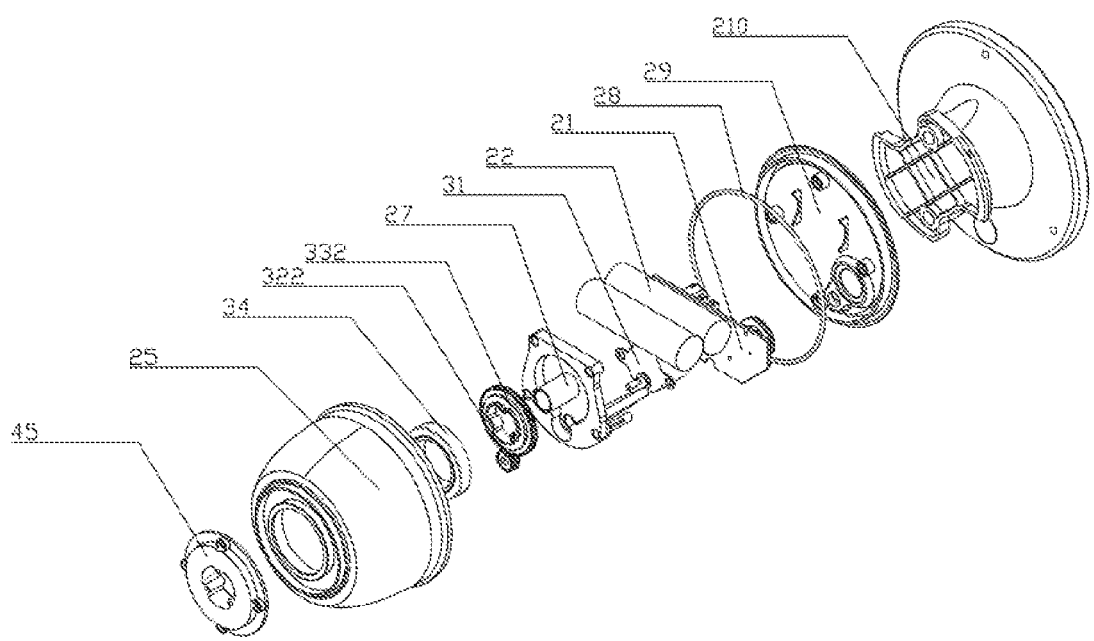
FIG. 12 is an exploded view of a lamp holder in Embodiment 2 of the invention.

Then, referring to FIG. 1 and FIG. 7-FIG. 12 which illustrate the double-axis sun-tracking adjustment system, the double-axis sun-tracking adjustment system comprises a lamp body 1, a support rod assembly 4 and a lamp holder 2, wherein the lamp body 1 is hinged to the support rod assembly 4, and the support rod assembly 4 is rotatably connected to the lamp holder 2, such that the lamp body 1 can rotate with respect to the support rod assembly 4, and the support rod assembly 4 can rotate with respect to the lamp holder 2 together with the lamp body 1; a shell of the lamp body 1 is composed of a front lamp body cover 18 and a rear clamp body cover 19 which are buckled together, a solar photovoltaic panel 11 is bonded on the outer side of the front lamp body cover 18, rectangular holes are formed in midpoints of the four edges of the front lamp body cover 18, photosensitive sensors 12 and an LED lamp unit 13 are disposed in the lamp body 1, a waterproof rubber ring 110 is disposed between the LED lamp unit 13 and the rear lamp body cover 19, a first connecting shell 111 and a second connecting shell 112 are fixedly connected to the center of the rear lamp body cover 19, rotating ends of the support rod assembly 4 are buckled on the first connecting shell 111 and the second connecting shell 112, and the support rod assembly 4 can rotate in the first connecting shell 111 and the second connecting shell 112, that is, the lamp body 1 can rotate with respect to the support rod assembly 4; the number of the photosensitive sensors 12 is four, and the four photosensitive sensors 12 can acquire light information through the rectangular holes in the front lamp body cover 18; when the position of the sun changes, light intensities received by the four photosensitive sensors 12 will be different, and a difference between the light intensities received by the four photosensitive sensors 12 is determined through a chip in the main control circuit board 21; when the difference between the light intensities acquired by the four photosensitive sensors 12 is zero, the sunlight coincides with the normal of the solar photovoltaic panel 11, and the charging efficiency of the solar photovoltaic panel 11 is optimal; the support rod assembly 4 comprises a support rod 41, an actuating device 3, a bearing pedestal 42, a bearing cap 43, an end cover 44 and a support rod seat 45, wherein the actuating device 3 comprises a stepping motor 31, a driving gear 322, a driven gear 332 and a bearing 34, the support rod seat 45 is fixedly connected to the support rod 41, the stepping motor 31 in the actuating device 3 is fixedly connected to the support rod 41, an output end of the stepping motor 31 is connected to the driving gear 322, the driving gear 322 and the driven gear 332 are engaged for transmission, an outer ring of a hub of the driven gear 332 is in interference fit with an inner ring of the bearing 34, an outer ring of the bearing 34 is in interference fit with the bearing pedestal 42, the bearing cap 43 is fixedly connected to the bearing pedestal 42 to prevent the bearing 34 from moving laterally, the end cover 44 is fixedly connected to the driven gear 332 and is also fixedly connected to the second connecting shell 112, such that the torque of the stepping motor 31 can be transmitted to the lamp body 1 through the driving gear 322 and the driven gear 332; the lamp holder 2 comprises an actuating device 3, a lamp holder hood 25, a mounting frame 27, a battery 22, a main control circuit board 21, a sealing ring 28, a rear lamp holder cover 29, and a lamp holder stand 210, the actuating device 3 is also composed of a stepping motor 31, a driving gear 322, a driven gear 332 and a bearing 34, the stepping motor 31 is fixedly connected to the mounting frame 27, the main control circuit board 21 is fixedly connected to the mounting frame 27, the mounting frame 27 is fixedly connected to the rear lamp holder cover 29, the lamp holder hood 25 is fixedly connected to the rear lamp holder cover 29, the rear lamp holder cover 29 is fixedly connected to the lamp holder stand 210, the driven gear 332 is fixedly connected to the support rod seat 45, an output end of the stepping motor 31 is connected to the driving gear 322, the driving gear 322 is engaged with the driven gear 332, an outer ring of a hub of the driven gear 332 is in an interference fit with an inner ring of the bearing 34, an outer ring of the bearing 34 is an interference fit with the lamp holder hood 25, and as shown in FIG. 10, the actuating device 3 in the support rod assembly 4 and the actuating device 3 in the lamp holder 2 are mounted perpendicular to each other, when the stepping motor 31 operates, the support rod assembly 4 and the lamp body 1 can be driven to rotate in the vertical direction, a switch and an indicator light are integrated on the main control circuit board 21, and a corresponding hole is formed in the rear lamp holder cover 29, such that users can know the usage state of the lamp visually and quickly; a remote control module is integrated on the main control circuit board 21, such that users can adjust the angle through wireless remote control by means of a software program, infrared rays, Bluetooth, or wifi.

The operating process of the double-axis sun-tracking adjustment system comprises:

Step 1: acquiring, by multiple photosensitive sensors 12, ambient light intensities at a current angle;

Step 2: receiving, by the main control circuit board 21, the current ambient light intensities sent from the photosensitive sensors 12; and Step 3: comparing, by the main control circuit board 21, the received ambient light intensities, and determining whether there is a difference between the ambient light intensities; if so, turning on, by the main control circuit board 21, a power supply of the stepping motors 31 and transmitting rotary power of the stepping motors 31 to the lamp body 1 through a driving mechanism to enable the solar photovoltaic to rotate with the lamp body 1; otherwise, keeping the angle of the solar photovoltaic panel 11 unchanged;

A voltage change threshold is set for the photosensitive sensors 12; and if the voltage of the photosensitive sensors 12 is less than the voltage change threshold, the main control circuit board 21 drives a power supply of the LED lamp unit 13; otherwise, the main control circuit 21 turns off the power supply of the LED lamp unit 13.

The invention has the following advantages:

1. In the invention, the operation of the motor can be automatically controlled according to information acquired by the photosensitive sensors to enable the solar photovoltaic panel on the lamp body to rotate to follow the sun, such that the charging efficiency is improved.

2. In the invention, the actuating device adopts a worm-gear mechanism with a self-locking function as a driving mechanism, such that position deviations of the lamp body caused by external factors can be avoided.

3. In the invention, the angle can be adjusted through wireless remote control by means of a software program, infrared rays, Bluetooth, wifi, or the like.

4. In the invention, the microwave radar detection module is arranged to monitor passengers passing-by in real time and can automatically enable the lighting function when necessary, and the microwave radar avoids the reduction of sensitivity and other interference factors caused by changes of the air temperature, such that the accuracy and reliability are improved.

The embodiments disclosed above are merely specific ones of the invention, and the invention is not limited to the above embodiments. All changes obtained by those skilled in the art should fall within the protection scope of the invention.

What is claimed is:

1. A universal sun-tracking adjustment device, comprising a lamp body, a lamp holder and an actuating device, wherein:

the lamp body comprises an LED lamp unit, a solar photovoltaic panel and photosensitive sensors, the solar photovoltaic panel and the photosensitive sensors are fixedly mounted on a surface of the lamp body and are located on a same side of the lamp body, and the LED lamp unit is fixedly mounted on a side, away from the solar photovoltaic panel, of the lamp body;

the lamp holder comprises a main control circuit board and a battery, the main control circuit board and the battery are fixedly mounted in the lamp holder, a microwave radar detection module, a remote control module, a memory module and a warning light are disposed on the main control circuit board, and the solar photovoltaic panel, the photosensitive sensors and the main control circuit board are all electrically connected to the battery;

the actuating device comprises a stepping motor, a first rotating member and a second rotating member, the first rotating member is fixedly connected to an output end of the stepping motor, the second rotating member is fixedly connected to the lamp body, the first rotating member and the second rotating member are engaged for transmission, the stepping motor and the second rotating member are fixedly connected to the lamp body and the lamp holder respectively, and the stepping motor is electrically connected to the battery;

the lamp body is rotatably connected to the lamp holder through the actuating device.

2. The universal sun-tracking adjustment device according to claim 1, wherein the lamp body comprises two photosensitive sensors, an angle between the two photosensitive sensors is 120°, and a normal of the angle between the two photosensitive sensors is perpendicular to the solar photovoltaic panel.

3. The universal sun-tracking adjustment device according to claim 2, wherein the actuating device comprises a first bearing, the first rotating member in the actuating device is a worm, the second rotating member is a worm gear, a hub on a side of the worm gear is higher than a tooth surface, a first mounting hole to be fixedly connected to the lamp body is formed in an inner ring of the worm gear, a first wire hole allowing a wire to penetrate through is formed in the inner ring of the worm gear, an outer ring of the hub on the side, higher than the tooth surface, of the worm gear is in interference fit with an inner ring of the first gear, and an outer ring of the first bearing is in interference fit with the lamp holder.

4. The universal sun-tracking adjustment device according to claim 1, wherein the lamp body comprises four photosensitive sensors regularly mounted on a periphery of the solar photovoltaic panel.

5. The universal sun-tracking adjustment device according to claim 4, wherein a support rod assembly is disposed between the lamp body and the lamp holder, the first rotating member in the actuating device is a driving gear, the second rotating member is a driven gear, two said actuating devices are arranged, the lamp body is rotatably connected to the support rod assembly through one said actuating device, the lamp holder is rotatably connected to the support rod assembly through the other actuating device, and the two actuating devices are mounted perpendicular to each other.

6. The universal sun-tracking adjustment device according to claim 5, wherein the actuating device comprises a second bearing, a hub on a side of the driven gear is higher than a tooth surface, a second mounting hole fixedly connected to the lamp body or the support rod assembly is formed in an inner ring of the driven gear, a second wire hole allowing a wire to penetrate through is formed in the inner ring of the driven gear, an outer ring of the hub on the side, higher than the tooth surface, of the driven gear is in interference fit with an inner ring of the second bearing, and an outer ring of the second bearing is in interference fit with the support rod assembly and/or the lamp holder.

7. A universal sun-tracking adjustment method, comprising:
  acquiring, by multiple photosensitive sensors, ambient light intensities at a current angle;
  receiving, by a main control circuit board, the current ambient light intensities sent from the photosensitive sensors; and
  comparing, by the main control circuit board, the received ambient light intensities, and determining whether there is a difference between the ambient light intensities; if so, turning on, by the main control circuit board, a power supply of a stepping motor, and transmitting rotary power of the stepping motor to a lamp body through a driving mechanism to enable a solar photovoltaic to rotate with the lamp body; otherwise, keeping the angle of the solar photovoltaic panel unchanged;
  wherein a voltage change threshold is set for the photosensitive sensors; and if a voltage of the photosensitive sensors is less than the voltage change threshold, the main control circuit board drives a power supply of an LED lamp unit and synchronously drives an actuating device to rotate the lamp body to a lighting position recorded in a memory module; otherwise, the main control circuit turns off the power supply of the LED lamp unit;
  when the photosensitive sensors are covered by foreign matter and are unable to acquire the light intensities normally, the main control circuit enters a memory working mode according to a recent working state of a device and turns on a warning light to remind users that the sensors are abnormal;
  the main control circuit is able to manage and monitor a state of charge of a battery to realize linear adjustment of brightness, such that an optimal lighting time is obtained.

8. A universal sun-tracking adjustment system, adopting a universal sun-tracking adjustment device comprising a lamp body, a lamp holder and an actuating device, wherein:
  the lamp body comprises an LED lamp unit, a solar photovoltaic panel and photosensitive sensors, the solar photovoltaic panel and the photosensitive sensors are fixedly mounted on a surface of the lamp body and are located on a same side of the lamp body, and the LED lamp unit is fixedly mounted on a side, away from the solar photovoltaic panel, of the lamp body;
  the lamp holder comprises a main control circuit board and a battery, the main control circuit board and the battery are fixedly mounted in the lamp holder, and the solar photovoltaic panel, the photosensitive sensors and the main control circuit board are all electrically connected to the battery;
  the actuating device comprises a stepping motor, a first rotating member and a second rotating member, the first rotating member is fixedly connected to an output end of the stepping motor, the second rotating member is fixedly connected to the lamp body, the first rotating member and the second rotating member are engaged for transmission, the stepping motor and the second rotating member are fixedly connected to the lamp body and the lamp holder respectively, and the stepping motor is electrically connected to the battery; the lamp body is rotatably connected to the lamp holder through the actuating device;
  a microwave radar detection module, a remote control module and a memory module are disposed on the main control circuit board;
  the lamp body comprises multiple said photosensitive sensors, and a normal of an angle between the photosensitive sensors is perpendicular to the solar photovoltaic panel;
  the actuating device comprises a first bearing, the first rotating member in the actuating device is a worm, the second rotating member is a worm gear, a hub on a side of the worm gear is higher than a tooth surface, a first mounting hole to be fixedly connected to the lamp body is formed in an inner ring of the worm gear, a first wire hole allowing a wire to penetrate through is formed in an inner ring of the worm gear, an outer ring of the hub on the side, higher than the tooth surface, of the worm gear is in interference fit with an inner ring of the first gear, and an outer ring of the first bearing is in interference fit with the lamp holder;
  the operating process of the universal sun-tracking system comprises:
  Step 1: acquiring, by multiple photosensitive sensors, ambient light intensities at a current angle;
  Step 2: receiving, by the main control circuit board, the current ambient light intensities sent from the photosensitive sensors; and
  Step 3: comparing, by the main control circuit board, the received ambient light intensities, and determining whether there is a difference between the ambient light intensities; if so, turning on, by the main control circuit board, a power supply of the stepping motor, and transmitting rotary power of the stepping motor to the lamp body through a driving mechanism to enable the solar photovoltaic to rotate with the lamp body; otherwise, keeping the angle of the solar photovoltaic panel unchanged;
  a voltage change threshold is set for the photosensitive sensors; and if a voltage of the photosensitive sensors is less than the voltage change threshold, the main control circuit board drives a power supply of the LED lamp unit and synchronously drives the actuating device to rotate the lamp body to a lighting position recorded in the memory module; otherwise, the main control circuit turns off the power supply of the LED lamp unit;

when the photosensitive sensors are covered by foreign matter, the main control circuit enters a memory working mode according to a recent working state of the device and turns on a warning light to remind users that the sensors are abnormal;

the main control circuit is able to manage and monitor a state of charge of the battery to realize linear adjustment of brightness, such that an optimal lighting time is obtained.

\* \* \* \* \*